United States Patent [19]

Roinestad et al.

[11] Patent Number: 4,867,301

[45] Date of Patent: Sep. 19, 1989

[54] CONVEYOR BELT AND SYSTEM FOR SINGLE DIRECTION LATERAL CURVED TRAVEL

[75] Inventors: Gerald C. Roinestad; Michael R. Straight, both of Winchester, Va.

[73] Assignee: Ashworth Bros., Inc., Fall River, Mass.

[21] Appl. No.: 171,390

[22] Filed: Mar. 21, 1988

Related U.S. Application Data

[63] Continuation-in-part of Ser. No. 83,272, Aug. 10, 1987, abandoned.

[51] Int. Cl.$^4$ .............................................. B65G 17/06
[52] U.S. Cl. .................................. 198/852; 198/831; 198/778
[58] Field of Search ......... 198/778, 831, 849, 851–853

[56] References Cited

U.S. PATENT DOCUMENTS

| Re 27,690 | 7/1973 | Roinestad et al. .................. 198/852 |
| 1,626,492 | 4/1927 | Youngson . |
| 2,219,724 | 10/1940 | Quick . |
| 2,278,361 | 3/1942 | Rapisarda . |
| 2,706,033 | 4/1955 | Williams . |
| 3,225,898 | 12/1965 | Roinestad . |
| 3,261,451 | 7/1966 | Roinestad . |
| 3,270,863 | 9/1966 | Ackles . |
| 3,315,492 | 4/1967 | Dreksler . |
| 3,319,778 | 5/1967 | Bessant . |
| 3,348,659 | 10/1967 | Roinestad . |
| 3,659,697 | 5/1972 | Brackmann et al. . |
| 3,664,487 | 5/1972 | Ballenger . |
| 3,750,859 | 8/1973 | Smith . |
| 3,920,117 | 11/1975 | Roinestad ........................... 198/853 |
| 3,938,651 | 2/1976 | Alfred . |
| 4,036,352 | 7/1977 | White . |
| 4,078,655 | 3/1978 | Roinestad . |
| 4,118,181 | 10/1978 | Onodera . |
| 4,222,483 | 9/1980 | Wootton et al. ................... 198/831 |
| 4,440,367 | 4/1984 | Daringer . |
| 4,448,301 | 5/1984 | Alger . |
| 4,450,953 | 5/1984 | Le Cann et al. . |
| 4,557,374 | 12/1985 | Bode . |
| 4,565,282 | 1/1986 | Olsson et al. ...................... 198/778 |
| 4,603,776 | 8/1986 | Olsson . |
| 4,662,509 | 5/1987 | Kaak . |
| 4,741,430 | 5/1988 | Roinestad . |

FOREIGN PATENT DOCUMENTS

| 293095 | 11/1988 | European Pat. Off. . |
| 34766 | 11/1964 | Fed. Rep. of Germany ...... 198/853 |
| 830287 | 3/1960 | United Kingdom . |
| 1090630 | 11/1967 | United Kingdom . |
| 1301655 | 1/1973 | United Kingdom ................ 198/853 |
| 1575729 | 9/1980 | United Kingdom ................ 198/853 |
| 2072123 | 9/1981 | United Kingdom . |
| 2205545 | 12/1988 | United Kingdom . |

OTHER PUBLICATIONS

Frigoscandia's FRIGOBELT and GYRoFREEZE C brochure.
Allied-Locke Industries, Inc. Catalog Number 882 literature.
Power Transmission Design, p. 104, 6/88.

Primary Examiner—Joseph E. Valenza
Attorney, Agent, or Firm—Banner, Birch, McKie & Beckett

[57] ABSTRACT

A conveyor belt and conveying system designed to operate about lateral curves in a single direction is disclosed. The conveyor belt is comprised of transverse rods interconnected by links disposed along opposite transverse edges of the belt. When the belt proceeds about a lateral curve, the pitch along the inside edge of the curve is kept substantially the same as in straight line motion, while the outside edge of the belt is allowed to expand to a second greater pitch. In one embodiment support links are disposed along the inside edge of the belt and provide support for the inside edge of successive tiers of the belt as the belt travels a helical path. A specific link construction which uses a worked hardened bearing surface is also disclosed.

48 Claims, 6 Drawing Sheets

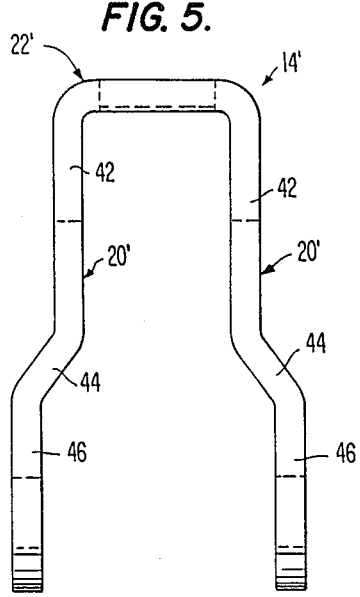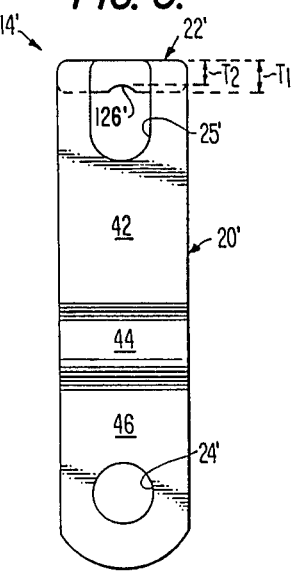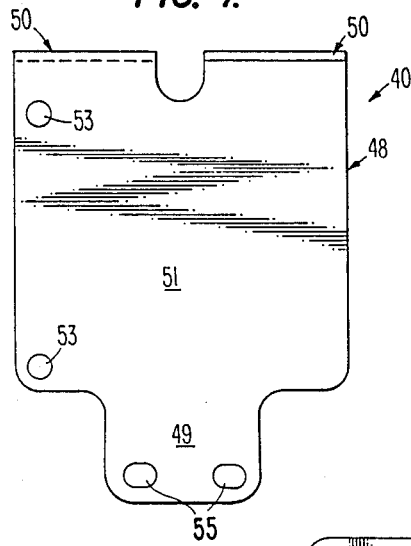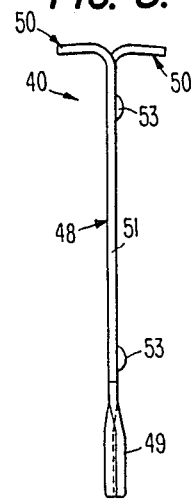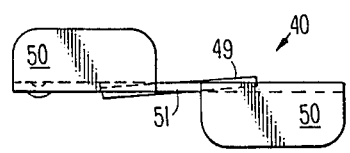

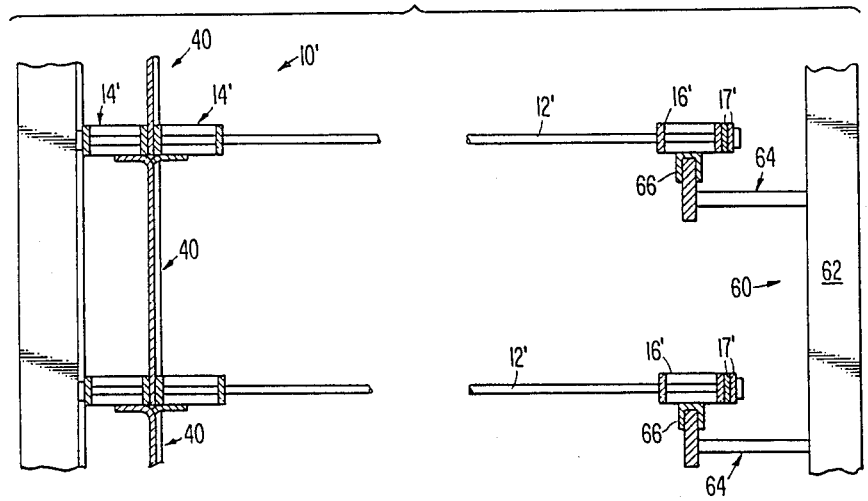

CONVEYOR BELT AND SYSTEM FOR SINGLE DIRECTION LATERAL CURVED TRAVEL

RELATED APPLICATION

This application is a continuation-in-part of application Ser. No. 083,272, filed on Aug. 10, 1987, now abandoned.

TECHNICAL FIELD

This invention relates to a conveyor belt and system designed to travel about lateral curves. More specifically, the invention concerns a conveyor belt which includes transverse rods connected by links disposed along the opposite transverse ends of the rods, wherein the inside ends of the rods along the inside edge of the belt are kept at a constant first pitch and the outside ends of the rods are allowed to move to a second larger pitch.

BACKGROUND OF THE INVENTION

Conveyor belts comprised of transverse rods connected by links disposed along the opposite transverse edges of the belt have been in use for a long period of time. One such prior art belt uses generally U-shaped nestable links with slotted holes that allow the links to slide on the rods. The relative sliding action between the links and rods provides lateral flexibility which enables the belt to turn right or left, when such nestable links are used on both sides of the belt. When such a belt proceeds around a lateral curve, the rod ends along the inside concave edge of the belt collapse. The opposite transverse ends of the rods along the outside convex edge of the belt either remain at the same pitch as when the belt travels in a straight line direction, such as disclosed in U.S. Pat. No. 3,225,898 to Roinestad, or expand to a greater pitch in order to allow the belt to proceed around a smaller radius, as disclosed in U.S. Pat. No. 4,078,655 to Roinestad.

The collapsing or diminishing pitch of the belt along the inside edge of a lateral curve creates several problems. First of all, most ware is charged into a conveying system in a rank and file arrangement, and spacing of the ranks (crosswise rows) can only be controlled by adjusting the relative speeds of the individual feed conveyors. To make certain that the ware does not overlap, it is necessary to take into account the collapsing pitch and to also leave a safety margin in the spacing, both of which result in a drop in efficiency. If the ware being conveyed is soft in nature, the collapsing pitch can result in wrinkling of the ware. Also, if the conveyor is used in a freezing plant, the collapsing pitch can result in contact and freezing together or adjacent ware if sufficient spacing is not used.

U.S. Pat. No. 4,662,509 issued to Kaak on May 5, 1987 addresses the problem of a conveyor belt having a collapsing inner edge in a chain type conveyor belt wherein the ware support carriers are connected directly to a drive chain. The chain conveyor belt in the '509 patent uses triangular carriers consisting of a rod-shaped element and a pulling element. Along the inside edge of the conveyor belt, the rod-shaped element and the pulling element are pivotably connected to the drive chain, and the pitch of the rod-shaped elements is held constant by the connection to the drive chain. The pulling elements slant backward in the direction of travel of the belt and are pivotably connected to one of the rod-shaped elements further rearward along the belt. As the belt proceeds around a curve, the outside, free ends of the rod-shaped elements increase their spacing or pitch with respect to one another.

The conveyor belt disclosed in the '509 patent, however, has certain disadvantages or limitations. The triangular configuration of the ware carriers precludes negotiation about end pulleys or rolls, or operating through a vertical hanging take-up mechanism. The practical width of the ware carriers is limited by the triangular configuration, because the effectiveness of the pulling element diminishes with increasing width. Finally, the overlapping orientation of the pulling and rod-shaped elements gives rise to serious sanitation difficulties. The capability to clean between all elements of a belt is important when the conveyor belt is used in a food handling environment.

Parent application Ser. No. 083,272 discloses a conveyor belt designed to convey in both a straight line direction and around lateral curves. The belt is comprised of a plurality of rods and a mechanism for connecting the rods to form a length of belt. The rods extend transversely of the length of the belt between first and second transverse ends and are arranged adjacent one another along the length of the belt. The connecting mechanism includes a link mechanism disposed adjacent the first and second transverse ends of the rods for coupling adjacent pairs of rods to one another. The link mechanism also holds the first and second transverse ends of the rods at substantially the same first pitch during straight line motion of the belt, and during motion of the belt about a lateral curve, the link mechanism holds the rods to the first pitch along the transverse ends of the rods located at the inside concave edge of the lateral curve, moves the opposite transverse ends of the rods to a second greater pitch along the outside convex edge of the lateral curve as the belt proceeds from straight line to lateral curved motion, and returns the opposite transverse ends of the rods to the first pitch as the belt moves from lateral curved to straight line motion.

The conveyor belt in the present application can be adapted to travel around lateral curves in a single direction or around lateral curves in both the right and left directions. When the belt is designed to travel around lateral curves in a single direction, the link mechanism includes both single pitch links and dual pitch links. However, when the belt is designed to travel around lateral curves in both the left and right directions, dual pitch links are disposed along both edges of the belt. The dual pitch links are pivotable between a first position and a second position. In the first position the transverse ends of the rods connected by the respective links are held at the first pitch; and, during the pivoting motion of the links from the first to the second position, are moved from the first pitch to the second pitch.

Each of the dual pitch links includes a body which has a pivot aperture and a pitch changing slot. The transverse end of one of the rods is received in the pivot aperture and the transverse ends of an adjacent one of the rods is slidably received in the pitch changing slot. A cam mechanism is provided for pivoting the dual pitch links between their first and second positions during motion around lateral curves.

A conveyor belt formed of the transverse rods and dual pitch links allows the belt to operate in a straight line direction and around curves without the problems resulting from a conveyor belt that has a collapsing inner edge as it proceeds around lateral curves.

It has been discovered that in instances where the belt will travel about lateral curves of moderate curvature in only a single direction, the advantages of using non-collapsable constant pitch links along the inner concave edge of the belt can be accomplished without the use of dual pitch links along the outside edge of the belt, by substituting properly designed slotted outside links.

It has also been discovered that the use of a link mechanism which keeps the inside rod ends at a constant pitch along the inner concave edge of a belt, both with dual pitch links as disclosed in the parent application, and with nestable U-shaped outside links as disclosed herein is particularly suitable for use in a conveying system wherein the belt travels along a helical path with the belt being arranged in a number of superimposed helically extending tiers. In such a curved tier system, less amount of belt is necessary to accommodate the same amount of an offloading surface.

Prior art helical tier systems, such as disclosed in U.S. Pat. Nos. 3,348,659 and 4,078,655 to Gerald C. Roinestad have used conveying belts with a collapsing inner edge. The successive tiers of belt in the '659 and '655 patents are supported by a support frame separate from the belt. The minimum tier height in such a system is equal to the sum of the heights of the separate belt support frame, the ware being conveyed and the belt, resulting in a system with a relatively large vertical extent. U.S. Pat. No. 3,938,651 to Alfred et al. discloses a conveying system for conveying in a helical path wherein the belt is self-supporting along both the inner and outer edges of the belt.

Another aspect of the invention is directed to the construction of the U-shaped links, particularly the construction of the portion connecting the legs of the link. It has been known in the prior art to curve the bearing surface of the connecting portion of U-shaped links. For example, the bearing surface of certain pintle chain links manufactured by the Allied-Locke Industries, Incorporated are curved. However, such prior art curved bearing surfaces for tractive links do not substantially increase the wear characteristics of the links in the manner of the present invention.

SUMMARY OF THE INVENTION

The present invention is directed to a conveyor belt for conveying in both a straight line direction and around lateral curves in a single direction. The lateral curves have a predetermined maximum curvature with a predetermined radius of curvature. The belt is comprised of a plurality of rods and a mechanism for connecting the rods to form a length of belt. The rods extend transversely of the length of the belt between an inside end along the inside edge of the lateral curves and an outside end along the outside edge of the lateral curves. The rods are arranged adjacent one another along the length of the belt. The connecting mechanism includes a link mechanism disposed adjacent the inside and outside ends of the rods for coupling adjacent pairs of rods to one another. The link mechanism also keeps the inside and outside ends of the rods at substantially the same pitch during straight line motion of the belt. During motion of the belt about a lateral curve, the link mechanism keeps the inside ends of the rods at the first pitch and allows the outside ends of the rods to move to a second greater pitch as the belt moves from straight line to lateral curve motion and to return to the first pitch as the belt moves from the lateral curved to straight line motion. The link mechanism includes, along the inside concave edge of the belt, a plurality of separate inside links joining each pair of adjacent rods and, along the outside convex edge of the belt, at least one outside link joining each pair of adjacent rods. Each of the outside links has holes through which the rods extend including at least one slot to allow the outside ends of the rods to move to the second pitch. Each of the inside links includes holes having end surfaces spaced a predetermined distance such that a plurality of the inside links joining adjacent rods aligns the adjacent rods in a generally parallel relation at the first pitch when the belt is under tractive load in straight line conveying motion.

In a preferred embodiment of the invention, the inside links include at least two generally U-shaped links joining adjacent pairs of the rods, and the outside links include at least one generally U-shaped link joining adjacent pairs of the rods. Each of the U-shaped links has a pair of spaced leg portions extending generally in the lengthwise dimension of the belt and a connecting portion joining the spaced leg portions. Each of the leg portions has holes formed through it for the passage of an adjacent pair of rods. The holes in the leg portions of the inside and outside links have end surfaces with predetermined longitudinal spacing between the end surfaces. The holes in the inside links have a first longitudinal end surface spacing, while the holes in the outside links have a second, greater longitudinal end surface spacing. The first longitudinal spacing is correlated to second longitudinal spacing and to the predetermined radius of curvature so that in straight line conveying motion the inside ends of the rods are kept at the first pitch and the inside U-shaped links are tractive while the outside U-shaped links are non-tractive, and during lateral curved conveying motion the inside ends of the rods are kept at substantially the first pitch and at least one of the inside U-shaped links remains tractive while the outside ends of the rods move to the second greater pitch.

The correlation of the longitudinal spacing of the end surfaces is preferably set so that the outside ends of the rods contact the opposing end surfaces of the holes in the outside links when the belt travels around a lateral curve of the predetermined maximum curvature with the outside links assuming only a minimal amount of tractive load. Such a correlation assures that at least one of the inside links remains tractive and that the inside ends of the rods remain at substantially the first pitch. The use of this correlated spacing is particularly advantageous in a helical tiered conveying system wherein the curvature in the helix is the maximum curvature of the system. The belt can then be readily adapted to the system so that a non-collapsing inside edge is assured throughout the tiers of the system, while the outside edge of the belt moving through the tiers is stabilized by the contact of the rods with the end surface of the holes in the outside links.

Another preferred aspect of the present invention is directed to the use of at least one support link joining pairs of the adjacent rods. The support links include a longitudinal portion extending both longitudinally between a pair of the adjacent rods and vertically away from the rods, and at least one tab portion extending transversely from the longitudinal portion. Holes are formed in each longitudinal portion to couple the support links to adjacent pairs of rods. The tab portions are spaced a predetermined vertical distance from the rods to contact an inside edge of an adjacent vertically spaced tier of the belt and thereby support the inside edge of the superimposed tiers when the belt is arranged to travel along a helical conveying path.

The present invention is also directed to a conveying system which uses belts of the type described and which moves the belt through a helical conveying path that forms a plurality of stacked tiers of the belt. Belts which have a constant non-collapsing inside pitch are particularly useful in such stacked tier systems since a significantly less amount of belt is required for a given helical path over the amount of belt which is needed using prior art belts with a collapsing inside edge. The use of non-collapsing pitch in combination with a drive drum and support links along the inside edge of the belt is particularly advantageous, because localized shifting of the inside edge of the belt as it moves through the helical path is greatly minimized.

A further preferred aspect of the present invention is directed to the construction of the U-shaped links in a manner to substantially increase their wear characteristics. According to this aspect of the invention, tractive link members for connecting adjacent rods of an endless conveyor belt are comprised of a substantially flat piece of metal which is formed into a general U-shape with a pair of spaced leg portions joined by a connecting portion. The substantially flat piece of metal has a reduced thickness area in the connecting portion formed of a compressed, work-hardened area of the metal. The work-hardened area of the connecting portion forms a curved bearing surface against which a rod can bear.

In the system of the present invention the ware can be loaded as closely as possible, so that for a given ware capacity, the bet can be driven at a lower speed, thereby increasing the life of the belt. Also, a rod-link arrangement allows the belt to be used in normal charge and discharge operations, and about end pulleys, rolls and take-up mechanisms. Also, for a given inside radius of a lateral curve about which the belt travels, the tension on a belt of the present invention in a spiral or curved tier system would be less than with conventional rod-link belts.

The use of support links in accordance with the present invention, wherein the support links are used in combination with constant pitch U-shaped inside links, also results in significant advantages. The support links allow for a significant reduction in height of the external belt support, while maintaining compatibility with sprockets and allowing the belt to proceed about comparatively tight bends around rolls, pulleys, etc. Furthermore, these advantages are attained without the disadvantages of the collapsing inner belt edge mentioned above, such as lower efficiency, wrinkling of ware or freezing together of adjacent ware. A smoother transition from straight line conveying into helical, stacked tier conveying also results from preventing the collapse of the inner edge of the belt by the constant pitch U-shaped inside links.

Finally, the use of tractive links having work-hardened bearing surfaces greatly enhances the wear characteristics of the tractive links. The work-hardened, curved inner bearing surface of the connecting portion of the links reduces wear elongation of the links in two ways. First, by increasing the area of contact, the same volume of wear would represent a smaller elongation of the link pitch. Secondly, by forming the curved surface through a coining process which reduces the thickness of the connecting portion from a relatively large thickness to a smaller thickness, the connecting portion becomes a work-hardened, wear resistant section of material. Prevention of wear elongation of tractive links is particularly important for the belt of the present invention wherein the belt and conveyor system are designed so that the inside links remain tractive in both straight line and lateral curved motion, and, as the belt is frequently used in environments where sanitation is important, undesirable wear debris can be diminished.

Further objects, features and other aspects of this invention will be understood from the following detailed description of the preferred embodiment of this invention referring to the annexed drawings.

BRIEF DESCRIPTION OF THE DRAWINGS

FIG. 5 is a plan view of an improved U-shaped link having a work-hardened, curved bearing surface and modified leg portions;

FIG. 6 is a side view of the link illustrated in FIG. 5;

FIG. 7 is a side view of a support link in accordance with the present invention;

FIG. 8 is a front edge view of the support link illustrated in FIG. 7;

FIG. 9 is a top plan view of the support link illustrated in FIG. 7;

FIG. 10 is a schematic vertical sectional view illustrating a pair of stacked tiers of a conveyor belt with the support links disposed along the inside edge of the belt;

DETAILED DESCRIPTION OF THE INVENTION

Figure 1:
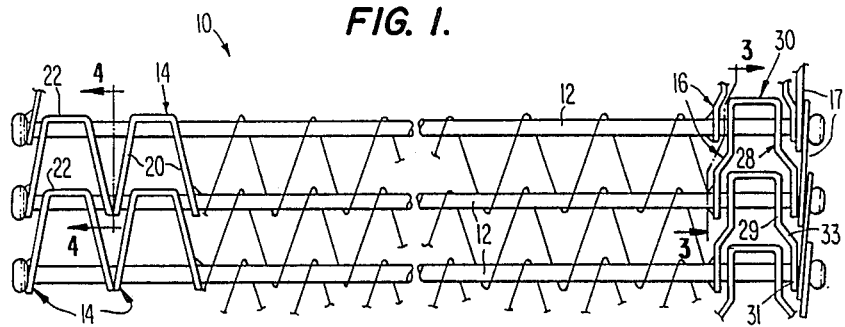
FIG. 1 is a plan view of a portion of the conveyor belt in accordance with the present invention, illustrating the belt traveling in a straight line direction.
Figure 2:
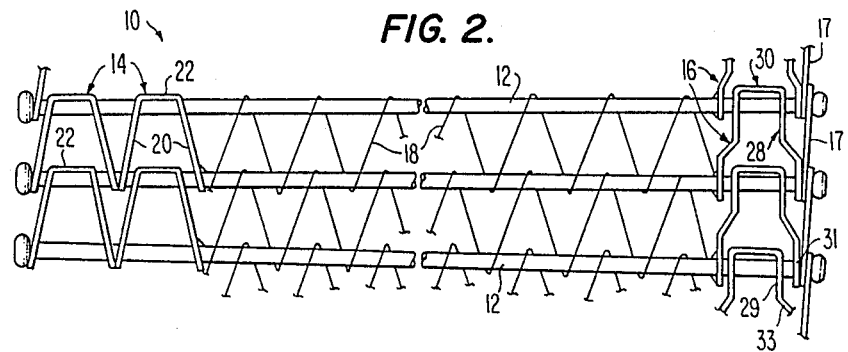
FIG. 2 is a plan view of the conveyor belt of FIG. 1, illustrating the belt passing around a lateral curve.

Referring to the Figures wherein like numerals indicate like elements, a portion of a conveyor belt 10 is shown in FIGS. 1 and 2. FIG. 1 illustrates the orientation of belt 10 as it moves in a straight line conveying motion, and FIG. 2 illustrates the orientation of belt 10 as it moves in a lateral curved direction to the left. The left edge of belt 10 therefore can be described as the inside concave edge of belt 10, while the right edge can be described as the outside convex edge of belt 10. Conveyor belt 10 is formed of a plurality of rods 12, which extend transversely of the length of belt 10 between inside and outside ends, inside links 14 along the inside edge of belt 10 and outside links 16 and 17 along the opposite, outside edge of belt 10. Links 14, 16 and 17 couple adjacent rods 12 to one another to form a length of belt 10. A woven mesh material 18 may be disposed around rods 12 and between links 14 and 16. The ends of rods 12 have enlarged or upset ends. Insidemost links 14 are held in position by welding to the inside enlarged ends of rod 12. The outermost inside links 14 and outside links 16 are likewise held in transverse position by being welded to rods 12.

Links 14 are generally U-shaped links having leg portions 20 which extend generally in the lengthwise direction of belt 10, and connecting portions 22, which join leg portions 20. Leg portions 20 have a pair of spaced holes 24, 25 for receiving the inside ends of a pair of rods 12. Holes 24, at the trailing end of link 14, are slightly oversized with respect to the cross-sectional dimension of rod 12 to permit cleaning of the belt. Holes 25, at the leading end of links 14, are in the form of a slot of oversized width, likewise for the purpose of permitting cleaning. Holes 24 and 25 are located and shaped so that the inside ends of rods 12 are kept at a first pitch (center to center spacing between adjacent rods 12) when the belt is under tractive load. Also, links 14 and rods 12 along the inside concave edge of belt 10 remain under tractive load during both straight line motion and lateral curved motion. As will be explained, the inside portions of rods 12 are kept at the first pitch and under tractive load in both straight line motion and lateral curved motion of belt 10 by the specific design of the combination of links 14, 16 and 17, which form a link mechanism for belt 10.

Inside links 14 have leg portions 20 which are substantially straight and which diverge outwardly from opposite ends of connecting portion 22. Alternatively, the inside links can be configured as links 14' illustrated in FIGS. 5 and 6. Link 14' has a connecting portion 22' similar to connecting portion 22, however, leg portions 20' are formed different from leg portions 20. Each leg portion 20' includes an inner section 42 extending generally perpendicularly from connection portion 22', a middle section 44 diverging outwardly from inner section 42, and an outer section 46 extending from middle section 44 in a direction generally parallel to inner section 42.

Figure 3:
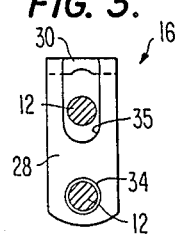
FIG. 3 is a sectional view taken generally along lines 3—3 of FIG. 1.
Figure 4:
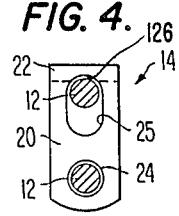
FIG. 4 is a sectional view taken generally along line 4—4 of FIG. 1.

Outside links 16 likewise each have a pair of spaced apart leg portions 28 joined by a connecting portion 30. Leg portions 28, like leg portions 20', include inner and outer sections 29 and 31, orientated perpendicular to connecting portion 30, which are joined by a middle outwardly diverging section 33 so that leg portions 28 take on a stepped configuration, gradually increasing in width away from connecting portion 30. Such a configuration is similar to prior art nestable U-shaped links. As seen in FIG. 3 each leg portion 28 has a pair of holes 34, 35 for receiving adjacent rods 12. Hole 35, which is adjacent connecting portion 30 is in the form of an elongate slot, which allows rods 12 to move from the collapsed position shown in FIG. 1 during straight line conveying motion, to the expanded position shown in FIG. 2, during conveying about lateral curves.

In addition to U-shaped links 16, bar links 17 can be disposed in a single row along the outer transverse edge of belt 10 between outside links 16 and the enlarged heads at the outer ends of rods 12. Similar to links 16, links 17 have a pair of holes, at least one of which is slotted to permit the expansion of the pitch of the outer edge of belt 12.

Each link 14, 14' is formed of a substantially flat piece of metal. The flat piece of metal has a first thickness $T_1$ along the top and bottom areas of connecting portions 22, 22' and along leg portions 20, 20'. A curved bearing surface 126, 126' is formed in the inner surface of connecting portions 22, 22', while the outer surface remains substantially flat. Bearing surface 26, 126' is formed by a coining process wherein the material of connecting portions 22, 22' is compressed to a maximum reduced thickness $T_2$. The compressed, reduced thickness area thus becomes a work-hardened area of connecting portions 22, 22'. The maximum reduced thickness $T_2$ is at least 90% of thickness $T_1$ and not less than preferably 70%. A typical example being $T_1$ of 0.105 inch reduced to $T_2$ of 0.80 inch. The curved bearing surface substantially mates with the outer surface of rod 12, i.e. has substantially the same radius of curvature. Links 16 can also include a work-hardened bearing surface. However, this is not necessary since links 16 are designed not to take on any significant tractive load.

Conveyor belt 10 and links 14, 16 and 17 are designed to be used in a conveying system wherein belt 10 will travel about lateral curves in a single direction and the lateral curves have a predetermined maximum curvature, i.e., the radius of curvature of the tightest lateral curve in the system will not be below a predetermined value. Links 14, 16 and 17 will have predetermined spacing between the forwardmost and rearwardmost surfaces of the holes in the links which is correlated to the predetermined maximum curvature of the belt travel and to one another. This correlation of spacing is set to assure that the portions of rods 12 along the inside edge of the belt remain at substantially the first pitch, and that at least one of the inside links 14, 14' continues to bear a tractive load while the belt proceeds around lateral curves up to the predetermined maximum curvature.

Conveyor belt 10 is driven along its inside edge in a conventional manner by a drive sprocket or drive cage engaging the inside edge of the belt. As the belt travels in a straight line direction, the tractive load is shared by all the inside links, and the inside ends of the rods are kept at the first pitch. The use of at least two inside U-shaped links assures that rods 12 extend substantially parallel during straight line motion under tractive load. If only one U-shaped link were used along the inside edge, the rods might extend in a non-parallel manner due to inaccuracies in the formation of the U-shape. It is therefore important that a plurality of inside links be used to assure the parallel alignment of the rods.

As belt 10 travels about a lateral curve, the outside ends of rods 12 expand in the slots of the outside links 16, 17 and the tractive load gradually shifts to the inside links farthest from the inside edge of the belt. Links 14 have a first predetermined spacing between the forwardmost and rearwardmost surfaces of their holes, and outside links 16 and 17 have a second, greater spacing between the forwardmost and rearwardmost surfaces of their holes. The first and second predetermined spacings are correlated to one another and to the predetermined maximum curvature of the belt so that outside links 16 and 17 assume only a minimal amount of the tractive load during travel about a lateral curve of the predetermined maximum curvature. Preferably, this predetermined spacing results in rods 12 contacting the bearing surfaces the holes in outside links 16 and/or 17 without assuming any measurable tractive load so that inside links 14 continue to assume substantially all the tractive load. This condition is particularly desirable because links 16 and 17 will allow only a negligible amount of play between links 16, 17 and the bearing surfaces of rods 12, thereby assuring smoothness of operation, while also insuring that the inside links remain tractive and the inside edge of the belt does not collapse. This is accomplished by setting the ratio of the spacing ($P_o'$) of the holes in the outside links 16, 17 to the distance ($R_o$) from the center of the radius of curvature of the belt to the outermost outside links in the tightest curve only slightly greater than the ratio of the spacing ($P_i$) of the holes 24, 25 in the inside links 14 to the distance ($R_i$) from the center of the radius of curvature of the belt to the outermost leg 20 of inside links 14. Using the equation:

$$R_o/R_i \times P_i = P_o;$$

then $P_o' = P_o + 0.005$ to 0.010 inches. For example, in a system with a four and a half (4½) foot radius drive cage, two one-inch inside links, and a three (3) foot wide belt: $R_i = 56$ inches; $R_o = 90$ inches; $P_i = 1.080$ inches; and $P_o = 1.735$ inches; then $P_o' = 1.740$ to 1.745 inches. In such a belt, where the tractive load in the helical path could typically be 200 pounds, the inside links would continue to assume 150 to 200 pounds of the tractive load in lateral curves of the predetermined maximum curvature.

In addition, U-shaped outside links 16 serve an important function in preventing the outer edge of belt 10 from lagging an unacceptable amount behind the perfect radial extension of rod 12 from inner links 14. Such lagging is a result of a drag force created by the weight of belt 10 and its associated product load on a support surface as the belt moves about a lateral curve. In order for the rods to lag, links 16 would have to rotate with respect to a perfect radial line of the rods in a curved path; however, such rotation is held to a minimum by the nesting action of consecutive U-shaped outside links 16, thereby restricting the amount of lag that can occur. For manufacturing ease, when U-shaped links 16 are used in combination with bar links 17, bar links 17 can be designed to have the correlated spacing $P_o'$ and links 16 can have an even greater longitudinal spacing between the end surfaces of their holes, thereby functioning principally to prevent lag.

Figure 11:
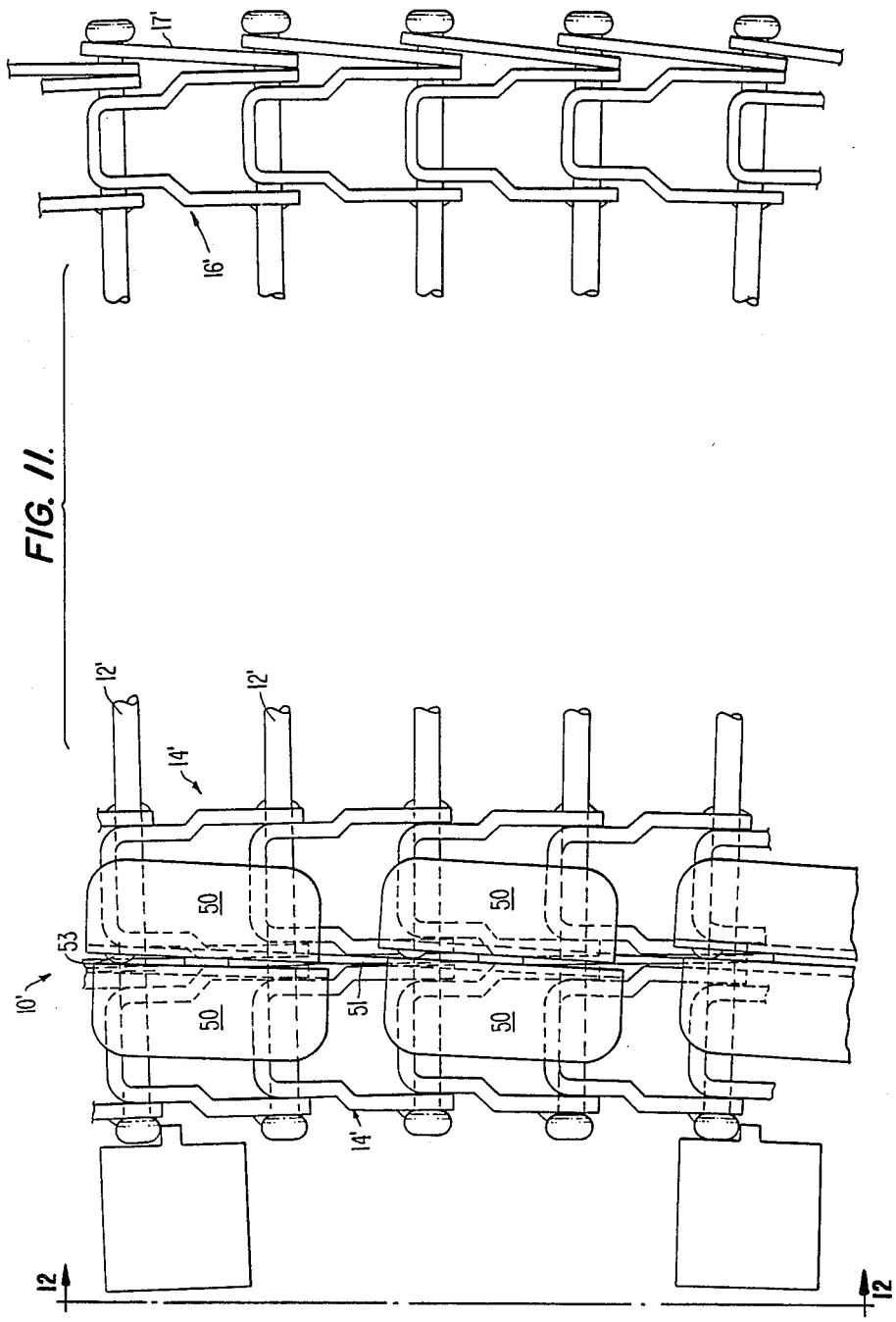
FIG. 11 is a top plan view of a portion of the conveyor belt illustrated in FIG. 10.
Figure 12:
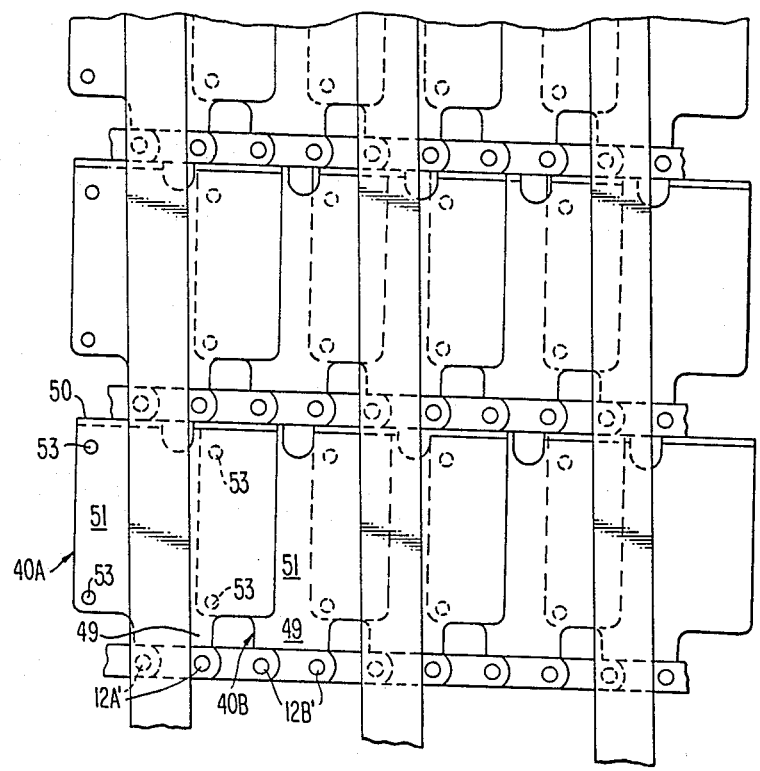
FIG. 12 is a side view taken generally along line 12—12 of FIG. 11.

FIGS. 10, 11, and 12 illustrate an embodiment of the invention wherein the conveyor belt 10' is used in a conveying system in which belt 10' travels along a helical path comprised of a number of superimposed helically extending tiers. The conveyor belt of this embodiment will be designated 10', with elements of belt 10' which are similar to belt 10 indicated by like primed numerals. FIGS. 7, 8 and 9 illustrate details of an inside support link 40 used with belt 10'.

Support links 40 include a longitudinal portion 48 and tab portions 50. Longitudinal portion 48 is formed in two sections, i.e., a lower section 49 and an upper section 51. Lower section 49 contains a pair of holes 55 for receiving ends of adjacent rods 12', and tab portions 50 extend in opposite transverse directions from an upper end of upper section 51. Upper section 51 extends both upward and longitudinally in two directions from lower section 49. As best seen in FIG. 12, a first support link 40A is coupled to a first pair of adjacent rods 12A', while the next support link 40B is coupled to the next separate pair of adjacent rods 12B'. Lower section 49 is held in alignment with the direction of travel of belt 10' by end sections 46 of U-shaped links 14'. Upper section 51 of support links 40 are angularly offset by approximately 4 degrees from the respective lower sections 49 in order to allow the longitudinal ends of adjacent longitudinal portions 51 to overlap. One end of longitudinal portions 51 include dimples 53 which keep the overlapping portions of adjacent support links 40 out of contact to permit cleaning.

Each tab portion 50 has a width which is sufficient to contact and support links 14' disposed in a tier above it. Also, the length of each tab portion 50 is set so that belt 10' can proceed around reverse bends without adjacent tab portions 50 coming into contact with one another.

As seen in FIG. 10, as the belt proceeds around a helical path, the outer ends of belt 10 are supported by an independent support structure 60. Support structure 60 includes a plurality of vertical members 62 (one of which is illustrated), from which a plurality of horizontal tier supports 64 extend. Each tier support 64 includes a low friction bearing material 66 on which outer links 16' slide. The inside edge of belt 10' is supported on a rotating base (not shown) and successive tiers of the helical path created by belt 10' are supported one upon another by means of support links 40. To accomplish this self-supporting feature, the vertical distance which tab portions 50 are located above rods 12' is selected to accommodate the particular helical path and the ware to be supported on belt 10'. Belt 10' is driven by an internal rotating cage which includes a plurality of vertically extending driving members 70.

Figure 13:
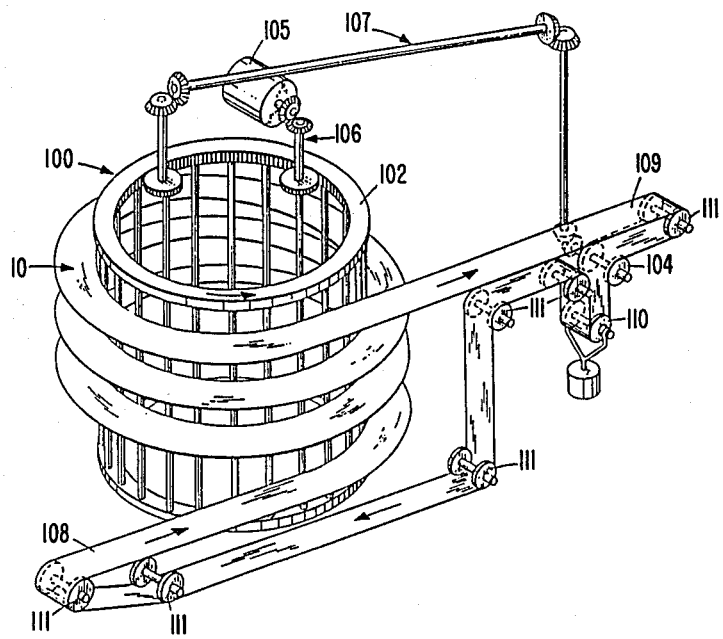
FIG. 13 is a schematic drawing of a conveyor system in accordance with the present invention wherein the belt conveys about a helical path and is driven by a frictional drive mechanism.

Referring now to FIG. 13 a spiral low tension conveying system 100 of the type shown in U.S. Pat. Nos. 4,078,655 and 3,348,659 is illustrated. System 100, can incorporate either of the belts 10 or 10' of the present invention. Since the low tension system is fully described in these patents, which are herein incorporated by reference, only a brief description will be given here. In such a low tension system 100, a cage type driving drum 102 frictionally engages the inner edge of belt 10 (or 10') to drive it with relatively low tension through a helical path around the drum. In addition, a positive sprocket drive 104 engages the belt 10 along a straight portion thereof. A motor 105 drives the drum 102 through gearing 106 and also drives the positive sprocket drive 104 through interconnected gearing 107. The belt 10 travels from the sprocket drive 104, past weighted tension take up roller 110 and idler pulleys 111 to straight loading portion 108, then in helical loops around the drum 102 to a straight discharge portion 109 and around another idler 111 back to the drive sprocket.

Figure 14:
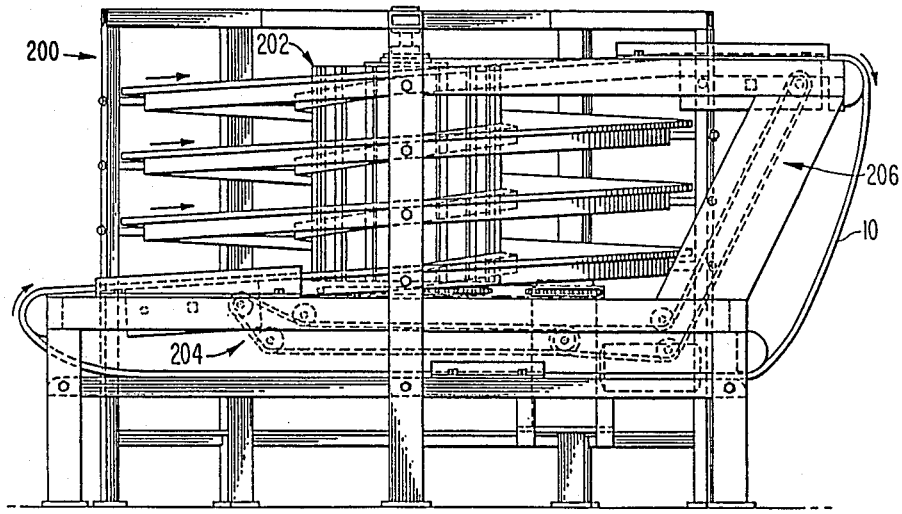
FIG. 14 is a schematic drawing of another embodiment of a conveyor system in accordance with the present invention wherein the conveyor belt conveys about a helical path and is driven by a positive drive mechanism.

Referring now to FIG. 14 a spiral very low tension conveying system 200 of the type shown in U.S. Pat. No. 4,741,430 issued on May 3, 1988, is illustrated. System 200 can incorporate either of the belts 10 or 10' of the present invention. Since the very low tension system is fully described in that patent application, which is herein incorporated by reference, only a brief description will be given here. In such a system 200, a cage type driving drum 202 positively engages the inner edge of belt 10 (or 10') to drive it with very low tension through a helical path around the drum. Driving drum 202 functions as the primary drive for the belt moving in the helical path; however, secondary drives 204 and 206 are provided adjacent the inlet and outlet of the helical path to maintain a desired fixed length of the belt in the helical path.

Belts 10 and 10' are particularly suited for use in systems 100 and 200. The maximum curvature of the system is located in the helical path and the spacing between the openings in links 14, 16, 17 (and 40, if used) is correlated to the radius of curvature of the helical path. This assures non-collapse of the inner edge of the belt within the helical path, while at the same time assuring smooth operation of the belt along its outer edge.

This invention has been described in detail in connection with the illustrated preferred embodiments. These embodiments, however, are merely for example only and the invention is not restricted thereto. It will be easily understood by those skilled in the art that other variations and modifications can be easily made within the scope of this invention, as defined by the appended claims.

We claim:

1. A conveyor belt for conveying in both a straight line direction and around lateral curves in a single direction, the lateral curves having a predetermined maximum curvature with a predetermined radius of curvature, the conveyor belt comprising a plurality of rods and connecting means for connecting said rods to form a length of the belt, said rods extending transversely of the length of the belt between an inside end along the inside edge of the lateral curves and an outside end along the outside edge of the lateral curves, said rods being arranged adjacent one another longitudinally along the length of the belt, said connecting means including link means disposed adjacent said inside and outside ends of said rods for coupling adjacent pairs of said rods to one another, said link means keeping the inside and outside ends of said rods at substantially the same first pitch during straight line motion of said belt and said link means further, during motion of the belt about said lateral curves, keeping said inside ends of said rods at substantially said first pitch and allowing said outside ends of said rods to move to a second greater pitch as the belt moves from straight line to lateral curved motion and to return to said first pitch as the belt moves from lateral curved to straight line motion, said link means including, along the inside concave edge of the belt, a plurality of separate inside links joining each pair of adjacent rods and, along the outside convex edge of the belt, at least one outside link joining each pair of adjacent rods, each of said outside links having holes through which said rods extend including at least one slot to allow, the outside ends of said rods to move between the first and second pitches, each of said inside links including holes having end surfaces spaced a predetermined distance such that a plurality of said inside links joining adjacent rods aligns the adjacent rods in a generally parallel relationship at said first pitch when said belt is placed under tractive load in straight line conveying motion.

2. A conveyor belt for conveying in both a straight line direction and around lateral curves in a single direction, the lateral curves having a predetermined maximum curvature with a predetermined radius of curvature, the conveyor belt comprising a plurality of rods and connecting means for connecting said rods to form a length of the belt, said rods extending transversely of the length of the belt between an inside end along the inside edge of the lateral curves and an outside end along the outside edge of the lateral curves, said rods being arranged adjacent one another longitudinally along the length of the belt, said connecting means including links means disposed adjacent said inside and outside ends of said rods for coupling adjacent pairs of said rods to one another, said link means including, along the inside concave edge of the belt, at least two generally U-shaped inside links joining the inside ends of each pair of adjacent rods and, along the outside convex edge of the belt, at least one generally U-shaped outside link joining the outside ends of each pair of adjacent rods, said generally U-shaped inside and outside links each having a pair of spaced leg portions joined by a connecting portion, each of said leg portions having holes for receiving said rods, said holes in the legs of said inside links having end surfaces with a first predetermined longitudinal spacing, said holes in the legs of said outside links having end surfaces with a second predetermined longitudinal spacing, said first and second longitudinal spacings being correlated to one another and to the predetermined radius of curvature so that in straight line conveying motion the inside ends of said rods are kept at a first pitch and the U-shaped inside links are tractive while the U-shaped outside links are non-tractive, and during lateral curved conveying motion the inside ends of said rods are kept at substantially the first pitch and at least one of the at least two U-shaped inside links remains tractive while the outside ends of said rods move to a second greater pitch.

3. A conveyor belt in accordance with claim 1 wherein said inside links include at least two generally U-shaped links joining each adjacent pair of said rods, each of said U-shaped links having a pair of spaced leg portions extending generally in the lengthwise direction of the belt and a connecting portion joining said spaced leg portions, each of said leg portions having said holes formed through it for receiving the inside ends of a pair of said rods.

4. A conveyor belt in accordance with claim 2 or 3 wherein said leg portions of said inside links are generally linear and each pair of said leg portions diverge from their respective connecting portion.

5. A conveyor belt in accordance with claim 1 including at least one support link disposed adjacent said inside links and coupled between pairs of said adjacent rods, said support links including a longitudinal portion extending both longitudinally between a pair of said adjacent rods and vertically away from said rods and at least one tab portion extending transversely from said longitudinal portion, holes being formed in said longitudinal portion through which an adjacent pair of rods extend, said tab portions being spaced a predetermined vertical distance from said rods to contact and support an inside edge of an adjacent vertically spaced tier of said belt when said belt is arranged to travel along a helical conveying path.

6. A conveyor belt in accordance with claim 2 including at least one support link disposed adjacent said inside links and coupled between pairs of said adjacent rods, said support links including a longitudinal portion extending both longitudinally between a pair of said adjacent rods and vertically away from said rods and at least one tab portion extending transversely from said longitudinal portion, holes being formed in said longitudinal portion through which an adjacent pair of rods extend, said tab portions being spaced a predetermined vertical distance from said rods to contact and support an inside edge of an adjacent vertically spaced tier of said belt when said belt is arranged to travel along a helical conveying path.

7. A conveyor belt in accordance with claim 5 wherein said inside links include a pair of generally U-shaped links joining adjacent pairs of said rods with one of said U-shaped links being disposed on either side of a respective one of said support links, each of said U-shaped links having a pair of spaced leg portions extending generally in the lengthwise direction of the belt and a connecting portion joining said spaced leg portions, each of said leg portions having said holes of said inside links formed through it.

8. A conveyor belt in accordance with claim 6 or 7 wherein said spaced leg portions of said U-shaped inside links have end sections adjacent to the longitudinal portions of said support links, and said end sections extending substantially perpendicular to the transverse extent of said rods to align said support links with respect to said rods.

9. A conveyor belt in accordance with claim 8 wherein said longitudinal portion of each of said support links has a lower section with said holes for coupling to said rods and an upper section extending vertically and longitudinally from the lower section, said upper section being angularly offset from the lower section and having a longitudinal dimension such that the upper sections of adjacent support links overlap one another.

10. A conveyor belt in accordance with claim 1 wherein said outside links include at least one generally U-shaped nestable link joining adjacent pairs of said rods.

11. A conveyor belt in accordance with claim 2 wherein said outside links further include at least one bar link disposed adjacent said generally U-shaped outside link and having holes for receiving and coupling adjacent pairs of said rods.

12. A conveyor belt in accordance with claim 1 or 3 wherein said outside links include at least one bar link having holes for receiving and coupling adjacent pairs of said rods.

13. A conveyor belt in accordance with claim 1 wherein each of said inside links has a work-hardened bearing surface.

14. A conveyor belt in accordance with claim 2 or 3 wherein said connecting portion of each of said U-shaped inside links has a work-hardened bearing surface.

15. A conveyor belt in accordance with claim 2 or 11 wherein the correlation between the longitudinally spaced end surfaces of the holes in said inside and outside links causes the outside ends of said rods to contact the opposing end surfaces in the holes of said outside links when the belt travels about a lateral curve of the predetermined maximum curvature with the outside links assuming a minimal amount of tractive load to assure that at least one of said inside links remains tractive and the inside ends of said rods remain at substantially the first pitch.

16. A conveyor belt in accordance with claim 15 wherein the ratio of the predetermined spacing between the holes of said outside links to the distance from the center of the said predetermined radius of curvature to the outermost outside links is only slightly greater than the ratio of the predetermined spacing between the holes in said inside links to the distance from the center of the predetermined radius of curvature to the outermost leg of said inside links.

17. A conveyor belt in accordance with claim 1 wherein said holes in said inside and outside links have end surfaces with predetermined longitudinal spacing correlated to one another and to the predetermined radius of curvature so that in straight line conveying motion the inside ends of said rods are kept at the first pitch and the inside links are tractive while the outside links are non-tractive, and during lateral curved conveying motion the inside ends of said rods are kept at substantially the first pitch and at least one of the inside links remains tractive while the outside ends of said rods move to a second greater pitch.

18. A conveyor belt in accordance with claim 17 wherein the correlation between the longitudinally spaced end surfaces of the holes in said inside and outside links causes the outside ends of said rods to contact the opposing end surfaces in the holes of said outside links when the belt travels about a lateral curve of the predetermined maximum curvature with the outside links assuming a minimal amount of tractive load to assure that at least one of said inside links remains tractive and the inside ends of said rods remain at substantially the first pitch.

19. A conveyor belt in accordance with claim 18 wherein the ratio of the predetermined spacing between the holes of said outside links to the distance from the center of the said predetermined radius of curvature to the outermost outside links is only slightly greater than the ratio of the predetermined spacing between the holes in said inside links to the distance from the center of the predetermined radius of curvature to the outermost of said inside links.

20. A conveyor belt for conveying in both a straight line direction and around lateral curves in a single direction, the lateral curves including a helical path and having a predetermined maximum curvature with a predetermined radius of curvature in the helical path, the belt comprising a plurality of rods and connecting means for connecting said rods to form a length of the belt, said rods extending transversely of the length of the belt between an inside end along the inside edge of the lateral curves and an outside end along the outside edge of the lateral curves, said rods being arranged adjacent one another longitudinally along the length of the belt, said connecting means including link means disposed adjacent said inside and outside ends of said rods for coupling adjacent pairs of said rods to one another, said links means including at least two generally U-shaped inside links and a support link disposed along the inside edge of said belt, and at least one generally U-shaped outside link disposed along the outside edge of the belt, said inside and outside U-shaped links each having a pair of spaced leg portions connected by a connecting portion, each of said leg portions having holes for receiving adjacent ones of said rods, said support links having a longitudinal portion extending both longitudinally between a pair of said adjacent rods and vertically away from said rods and at least one tab portion extending transversely from said longitudinal portion, said tab portion being spaced a predetermined vertical distance from said rods to contact and support an inside edge of an adjacent vertically spaced tier of said belt when said belt travels along the helical path, said longitudinal portion of said support links having holes for receiving adjacent ones of said rods, said holes formed in said inside links having end surfaces with a first predetermined longitudinal spacing, said holes formed in said outside links having a second predetermined longitudinal spacing, said first and second longitudinal spacings being correlated to one another and to the predetermined radius of curvature such that in straight line conveying motion the inside ends of said rods are kept at a first pitch and the inside U-shaped links are tractive while the outside U-shaped links are non-tractive, and during lateral curved conveying motion the inside ends of said rods are kept at substantially the first pitch and at least one of the inside U-shaped links remains tractive while the outside ends of the rods move to a second greater pitch.

21. A conveyor belt in accordance with claim 20 wherein said outside links include at least one bar link disposed adjacent said generally U-shaped outside links and having holes with said correlated predetermined second end surface spacing for receiving and coupling adjacent pairs of said rods.

22. A conveyor belt in accordance with claim 20 or 21 wherein the correlation between the longitudinally spaced end surfaces of the holes in the inside and outside links causes the outside ends of said rods to contact the opposing end surfaces in the holes of said outside links when the belt travels about a lateral curve of the predetermined maximum curvature with the outside links assuming a minimal amount of tractive load to assure at least one of said inside links remain tractive and the inside ends of said rods remain at substantially the first pitch.

23. A conveyor belt in accordance with claim 22 wherein the ratio of the predetermined spacing between the holes of said outside links to the distance from the center of the said predetermined radius of curvature to the outermost outside links is only slightly greater than the ratio of the predetermined spacing between the holes in the leg portions of said inside links to the distance from the center of the predetermined radius of curvature to the outermost leg of said inside links.

24. A conveyor belt in accordance with claim 20 wherein each of said support links is disposed between a pair of said U-shaped inside links, said spaced leg portions of said U-shaped inside links have end sections adjacent to the longitudinal portions of said support links, and said end sections extending substantially perpendicular to the transverse extent of said rods to align the support links with respect to said rods.

25. A conveyor belt in accordance with claim 20 or 24 wherein said longitudinal portion of each of said support links has a lower section with said holes for coupling to said rods and an upper section extending vertically and longitudinally from the lower section, said upper section being angularly offset from the lower section and having a longitudinal dimension such that the upper sections of adjacent support links overlap one another.

26. In a conveying system including a conveyor belt and a drive means for moving the belt along a conveying path, said system orienting the belt in both a straight line direction and around lateral curves in a single direction, the lateral curves including a helical portion forming a plurality of stacked tiers of the belt and having a predetermined maximum curvature with a predetermined radius of curvature in the helical portion, the belt comprising a plurality or rods and connecting means for connecting said rods to form a length of the belt, said rods extending transversely of the length of the belt between an inside end along the inside edge of the lateral curves and an outside end along the outside edge of the lateral curves, said rods being arranged adjacent one another longitudinally along the length of the belt, said connecting means including link means disposed adjacent said inside and outside ends of said rods for coupling adjacent pairs of said rods to one another, said link means keeping the inside and outside ends of said rods at substantially the same first pitch during straight line motion of said belt and said link means further, during motion of the belt about lateral curves keeping said inside ends of said rods at said first pitch and allowing said outside ends of said rods to move to a second greater pitch as the belt moves from straight line to lateral curved motion and to return to said first pitch as the belt moves from lateral curved to straight line motion, said link means including, along the inside concave edge of the belt, a plurality of separate inside links joining each pair of adjacent rods and, along the outside convex edge of the belt, at least one outside link joining each pair of adjacent rods, each of said outside links having holes through which said rods extend including at least one slot to allow the outside ends of said rods to move between the first and second pitches, each of said inside links including holes having end surfaces spaced a predetermined distance such that a plurality of said inside links joining adjacent rods aligns the adjacent rods in a generally parallel relationship at said first pitch when said belt is placed under tractive load in straight line conveying motion.

27. In a conveying system including a conveyor belt and a drive means for moving the belt along a conveying path, said system orientating the belt in both a straight line direction and around lateral curves in a single direction, the lateral curves including a helical portion forming a plurality of stacked tiers of the belt, and having a predetermined maximum curvature with a predetermined radius of curvature in the helical portion, the belt comprising a plurality of rods and connecting means for connecting said rods to form a length of the belt, said rods extending transversely of the length of the belt between an inside end along the inside edge of the lateral curves and an outside end along the outside edge of the lateral curves, said rods being arranged adjacent one another longitudinally along the length of the belt, said connecting means including link means disposed adjacent said inside and outside ends of said rods for coupling adjacent pairs of said rods to one another, said link means including, along the inside concave edge of the belt, at least two generally U-shaped inside links joining the inside ends of each pair of adjacent rods, and, along the outside edge of the belt at least one generally U-shaped link joining the outside ends of each pair of adjacent rods, said generally U-shaped inside and outside links each having a pair of spaced leg portions joined by a connecting portion, each of said leg portions having holes for receiving said rods, said holes in the legs of said inside links having end surfaces with a first predetermined longitudinal spacing, said holes in the legs of said outside links having end surfaces with a second predetermined longitudinal spacing, said first and second longitudinal spacings being correlated to one another and to the predetermined radius of curvature so that in straight line conveying motion the inside ends of said rods are kept at a first pitch and the U-shaped inside links are tractive while the U-shaped outside links are nontractive, and during lateral curved conveying motion the inside ends of said rods are kept at substantially the first pitch and at least one of the U-shaped inside links remains tractive while the outside ends of said rods move to a second greater pitch.

28. In a conveying system in accordance with claim 27 wherein said outside links include at least one bar link disposed adjacent said generally U-shaped outside links and having holes with said second predetermined correlated end surface spacing for receiving and coupling adjacent pairs of said rods.

29. In a conveying system in accordance with claim 27 or 28 wherein the correlation between the longitudinal spacing of the end surfaces of the holes in the inside and outside links causes the outside ends of said rods to contact the opposing end surfaces in the holes of said outside links when the belt travels about a lateral curve of the predetermined maximum curvature with the outside links assuming a minimal amount of tractive load to assure that at least one of said inside links remains tractive and the inside ends of said rods remain at substantially the first pitch.

30. In a conveying system in accordance with claim 29 wherein the ratio of the predetermined spacing between the holes of said outside links to the distance from the center of the said predetermined radius of curvature to the outermost outside links is only slightly greater than the ratio of the predetermined spacing between the holes in the leg portions of said inside links to the distance from the center of the predetermined radius of curvature to the outermost leg of said inside links.

31. In a conveying system in accordance with claim 26 wherein said holes in said inside and outside links having end surfaces with predetermined longitudinal spacing correlated to one another and to the predetermined radius of curvature so that in straight line conveying motion the inside ends of said rods are kept at the first pitch and the inside links are tractive while the outside links are nontractive, and during lateral curved conveying motion the inside ends of said rods are kept at substantially the first pitch and at least one of the inside links remains tractive while the outside ends of said rods move to a second greater pitch.

32. In a conveying system in accordance with claim 31 wherein the correlation between the longitudinally spaced end surfaces of the holes in said inside and outside links causes the outside ends of said rods to contact the opposing end surfaces in the holes of said outside links when the belt travels about a lateral curve of the predetermined maximum curvature with the outside links assuming a minimal amount of tractive load to assure that at least one of said inside links remains tractive and the inside ends of said rods remain at substantially the first pitch.

33. In a conveying system in accordance with claim 32 wherein the ratio of the predetermined spacing between the holes of said outside links to the distance from the center of the said predetermined radius of curvature to the outermost outside links is only slightly greater than the ratio of the predetermined spacing between the holes in said inside links to the distance from the center of the predetermined radius of curvature to the outermost inside links.

34. In a conveying system in accordance with claim 26 or 31 including at least one support link disposed adjacent said inside links and coupled between adjacent pairs of said rods, said support links having tab portions spaced a predetermined distance from said rods to contact and support the inside edge of a superimposed vertical tier of said belt.

35. In a conveying system in accordance with claim 27 including at least one support link disposed adjacent said inside links and coupled between adjacent pairs of said rods, said support links having tab portions spaced a predetermined distance from said rods to contact and support the inside edge of a superimposed vertical tier of said belt.

36. In a conveying system in accordance with claim 26 wherein said inside links include at least two generally U-shaped links joining inside ends of adjacent pairs of said rods, each of said U-shaped links having a pair of spaced leg portions extending generally in the lengthwise direction of the belt and a connecting portion joining said spaced leg portions, each of said leg portions having said holes of said inside links formed through it.

37. In a conveying system in accordance with claim 36 wherein said outside links include at least one generally U-shaped nestable link joining adjacent pairs of said rods.

38. In a conveying system in accordance with claim 37 wherein said outside links further includes at least one bar link disposed adjacent said generally U-shaped outside link and having holes for receiving and coupling adjacent pairs of said rods.

39. In a conveying system in accordance with claim 34 wherein said support links include a longitudinal portion extending both longitudinally between an adjacent pair of said rods and vertically away from said rods, said tab portion extending transversely from said longitudinal portion, said longitudinal portion having a lower section with said holes for coupling to said rods and an upper section extending vertically and longitudinally from the lower section, said upper section being angularly offset from the lower section and having a longitudinal dimension such that the upper sections of adjacent support links overlap one another.

40. In a conveying system in accordance with claim 35 wherein said support links include a longitudinal portion extending both longitudinally between an adjacent pair of said rods and vertically away from said rods, said tab portion extending transversely from said longitudinal portion, said longitudinal portion having a lower section from said holes for coupling to said rods and an upper section extending vertically and longitudinally from the lower section, said upper section being angularly offset from the lower section and having a longitudinal dimension such that the upper sections of adjacent support links overlap one another.

41. In a conveying system in accordance with claim 26 or 27 wherein said drive means includes a rotating driving member frictionally engaging the inside edge of said belt in the helical portion.

42. In a conveying system in accordance with claim 26 or 27 wherein said drive means includes a rotating driving member positively engaging the inside edge of said belt in the helical portion.

43. In a conveying system including a conveyor belt and a drive means for moving the belt along a conveying path, said system orientating the belt in both a straight line direction and around lateral curves in a single direction, the lateral curves including a helical portion forming a plurality of stacked tiers of the belt and having a predetermined maximum curvature with a predetermined radius of curvature in the helical portion, the belt comprising a plurality of rods and connecting means for connecting said rods to form a length of the belt, said rods extending transversely of the length of the belt between an inside end along the inside edge of the lateral curves and an outside end along the outside edge of the lateral curves, said rods being arranged adjacent one another longitudinally along the length of the belt, said connecting means including link means disposed adjacent said inside and outside ends of said rods for coupling adjacent pairs of said rods to one another, said link means including a pair of generally U-shaped inside links and a support link disposed along the inside edge of said belt, and a generally U-shaped outside link disposed along the outside edge of the belt, said U-shaped inside and outside links each having a pair of spaced leg portions connected by a connecting portion, each of said leg portions having holes for receiving adjacent ones of said rods, said support links having a longitudinal portion extending both longitudinally between a pair of said adjacent rods and vertically away from said rods and at least one tab portion extending transversely from said longitudinal portion, said tab portion being spaced a predetermined vertical distance from said rods to contact and support an inside edge of an adjacent vertically spaced tier of said belt when said belt travels along the helical portion, said longitudinal portion of said support links having holes for receiving adjacent ones of said rods, said holes formed in said inside links having end surfaces with a first predetermined longitudinal spacing, said holes formed in said outside links having end surfaces with a second predetermined longitudinal spacing, said first and second longitudinal spacings being correlated to one another and to the predetermined radius of curvature such that in straight line conveying motion the inside ends of said rods are kept at a first pitch and the U-shaped inside links are tractive while the U-shaped outside links are non-tractive, and during lateral curved conveying motion the inside ends of said rods are kept at substantially the first pitch and at least one of the U-shaped inside links remains tractive while the outside ends of the rods move to a second greater pitch.

44. In a conveying system in accordance with claim 43 wherein said outside links further include at least one bar link disposed adjacent said generally U-shaped outside links and having holes with said correlated second predetermined end surface spacing for receiving and coupling adjacent pairs of said rods.

45. In a conveying system in accordance with claim 43 wherein the correlation between the longitudinal spacing of the end surfaces of the holes in the inside and outside links causes the outside ends of said rods to contact the opposing end surfaces in the holes of said outside links when the belt travels about a lateral curve of the predetermined maximum curvature with the outside links assuming a minimal amount of tractive load to assure that at least one of said inside links remains tractive and the inside ends of said rods remain at substantially the first pitch.

46. A conveyor belt in accordance with claim 45 wherein the ratio of the predetermined spacing between the holes of said outside links to the distance from the center of said predetermined radius of curvature to the outermost outside links is only slightly greater than the ratio of the predetermined spacing between the holes in the leg portions of said inside links to the distance from the center of the predetermined radius of curvature to the outermost leg of said inside links.

47. In a conveying system in accordance with claim 43 wherein said drive means includes a rotating driving member frictionally engaging the inside edge of said belt in the helical portion.

48. In a conveying system in accordance with claim 43 wherein said drive means includes a rotating driving member positively engaging the inside edge of said belt in the helical portion.

* * * * *